June 1, 1965  W. ZAPP  3,186,376
EXPOSURE COUNTER FOR PHOTOGRAPHICAL ROLL-FILM CAMERAS
Filed June 24, 1963
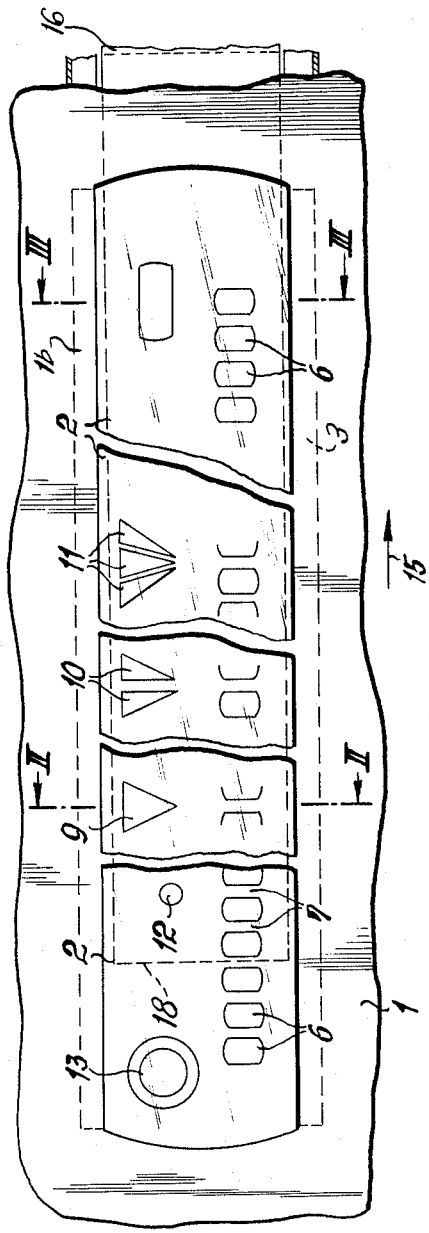
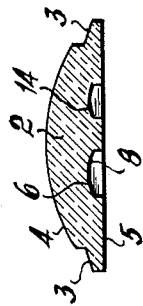
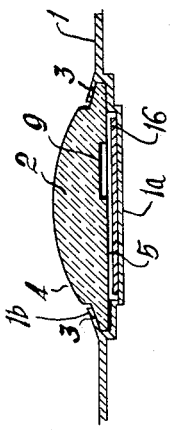

United States Patent Office 3,186,376
Patented June 1, 1965

3,186,376
EXPOSURE COUNTER FOR PHOTOGRAPHICAL ROLL-FILM CAMERAS
Walter Zapp, Ebenau, Oberegg, Appenzell Inner Rhoden, Switzerland, assignor to Minox G.m.b.H., Giessen-Heuchelheim, Germany, a German company
Filed June 24, 1963, Ser. No. 290,015
4 Claims. (Cl. 116—114)

The invention relates to an exposure counter for photographical roll-film cameras, especially for miniature cameras, which makes visible the steps of the stepwise transportation of the film and the exposed and unexposed lengths of the film or the number of exposed and unexposed frames in an especially clear and easily comprehensible manner.

It is known to combine the switch gear of a photographical roll-film camera for stepwise rotation of the film take-up roller with a counter mechanism which normally is provided with a stepwise rotated recording disk provided with a rim scale having small numbers which can be read by means of an associated index mark or through a small opening in the camera casing. However, reading of the small scale and numbers is often difficult.

It is one object of the present invention to arrange the exposure counter of a roll-film camera in such manner that it indicates the state of exposure in a more visible manner without the necessity of reading the small numbers of a movable scale.

It is one further object of the invention to provide the camera casing with a viewing slot which may be subdivided into a series of aligned windows lying closely side by side, wherein the length of said slot or the number of aligned windows corresponds to the total length of the film strip in a distinct ratio of transmission and to dispose below said slot or aligned windows a slide which is stepwise movable along said slot or series of windows and is of different color than a base surface or indicating area of the camera casing underlying said slide, the total length of the latter corresponding at least to that of said slot or total number of windows in such manner that by the stepwise movement of the slide the indicating area will be progressively covered or uncovered by the slide in such a way that the visible part of the indicating area and the visible part of the slide are always in the same proportion as the lengths of the exposed and non-exposed parts of the film strip.

It is one further object of the invention to dispose such viewing slot or series of windows in a transparent screen made of glass or transparent plastic material, to insert such screen into an outer wall of the camera casing and to provide such transparent screen with a transversely curved outer surface in the form of a rod-like optical lens of enlarging effect which will not only enlarge the visible parts of said slide and base surface, but will result also in a fairer appearance and lightening of the visible bright surfaces as distinguished from poorly visible dark surfaces.

In combination herewith it is still a further object of the invention to give a special curvature to the inner surface of said transparent windows in order to make them appear like a string of pearls at those places where said slide is underlying said windows, provided the visible surface of the slide has a bright color and the indicating area of the case wall has a dark color.

In order to facilitate counting of the exposures which have been made on the leading part of the film strip and to show the number of exposures which still can be made up to its end, a further object of the invention consists in the arrangement of additional indicating means by which the length of the viewing slot or the series of windows will be subdivided into sections of distinct length corresponding to a special number of exposures, say 10, 20, 30 exposures etc. Such indication means may be arranged on the same transparent screen and may be formed by additional windows in the latter, preferably of triangular shape which will also lie in the path of movement of said stepwise moved slide and will be brightly visible while the slide underlies those windows.

Finally the invention is also directed to the equipment of such indicator screen with further indicating means in the form of windows of other special shape which will indicate the moment when the camera will be ready for use after a certain number of idle transportation steps to be effected at the beginning of a new film strip and for indication of the moment when the last exposure has been made at the end of the strip when some further idle transportation steps will have to be made before the camera casing will be opened for removal of the film magazine. For facilitating the examination of these additional indications at the beginning and at the end of the film strip special provisions can be made for realizing these indications in special colors, e.g. an indication in red color at the beginning of the film strip and an indication in blue color at the end of the strip.

These and other features of the present invention will be understood by the following description of an example for the realization of the window screen of an exposure counter according to the present invention which is shown in the accompanying drawings in greatly enlarged dimensions and which is to be used for a miniature camera of the known Minox-type comprising a rod-like camera casing of rectangular cross-section in which the film will be stepwise fed by reciprocating longitudinal movements of movable casing parts in a well-known manner. In the drawings FIG. 1 shows part of an outer wall of the camera casing with the inserted window screen in plan view and FIGS. 2 and 3 are cross-sections through this casing wall along line II—II and through the screen alone along line III—III of FIG. 1.

The outer wall 1 of the rod-like casing of a miniature camera is provided with a rectangular depressed portion 1a extending lengthwise of the casing. A slot-like longitudinal opening is formed above the depressed wall between laterally spaced projections 1b of the wall. An exposure counter screen 2 formed from a bar of glass or other transparent material is inserted in this slot, said screen being provided with parallel lateral rim flanges 3 underlying the casing wall parts 1b. The outer surface 4 of the screen is smooth and curved in transverse direction while the lower surface 5 is plane, mat and unpolished. The lower surface contains a number of different recesses or depressions which all have a smooth ground surface and, therefore, are clearly transparent. Near one longitudinal rim flange 3 the screen comprises a row of closely adjacent recesses 6 forming the counter windows which are spaced from each other by small webs 7. The ground surface 8 of each of these windows is spherically curved. Therefore, each of these windows is forming a small optical lens.

Near its opposite longitudinal rim flange 3 the screen comprises in its lower surface recesses 9, 10, 11, 12, 13 and 14. The recesses 9, 10 and 11 consist of small triangles which are directed with their vertex towards the row of counter windows formed by the recesses 6 and which are arranged from the left end of said row of windows in a special distance from said end of the row and from each other, each of these distances corresponding to ten counter windows. These triangles form counter marks of which the first mark formed by one triangle 9 corresponds to a number of ten counter window while the second mark formed by two smaller pairwise arranged triangles 10 corresponds to the number 20 and the third mark formed by three triangles 11 corresponds to the number 30. Further index marks formed e.g. by small circular windows 12, may be arranged in distances corresponding to multiples of five counter windows 6. A large annular recess 13 in the unpolished lower surface 5 of the ledge 2 is to indicate the idle transportation steps of the film strip which have to be made before the beginning of the exposures of a fresh film strip, while a further recess 14 at the opposite end of the ledge is provided for indicating to the operator that a number of idle transportation steps have to be made after the last exposure has been indicated by the last counter window before the camera casing is to be opened for removal of the film magazine.

Below this transportation counter screen the camera casing contains a longitudinally movable flat slide 16, the length of which corresponds substantially to that of the transparent counter screen 2. The upper surface to this flat slide may be of white color or may be provided with a reflecting mirror-like tin foil, said flat slide being coupled to the transportation means of the film strip in such manner that its left end 18 is moved stepwise, at each transportation step of the film strip with a stroke corresponding to the width of one counter window 6, from the left end of the counter screen in direction of arrow 15 towards the right end. The inner surface of recess 13 may be spherically curved and may be provided with a transparent red lacquer coating. The bottom surface of recess 14 may be cylindrically curved in transverse direction and provided with a transparent coating of blue color.

It will be seen that the slide will move within a gap between the lower surface 5 of the transparent counter screen and the depressed part 1a of the casing wall. The upper surface of the depressed part 1a may be black or of any dark color to form an elongated indicating area contrasting in color with the color of the slide 16. Therefore, before the slide will begin its longitudinal movement with its left end from the left end of the counter screen 2 its right upper surface will be visible through all of the exposure counter windows 6. Consequently through the spherical curvature of the bottom surface 8 of the window recesses, each of the counter windows 6 will appear like a pearl, the row of windows thus appearing like a string of pearls which becomes shorter and shorter at each step of transportation of the film strip and of its co-ordinated flat slide.

After insertion of a film magazine into the camera casing the flat slide will underlie the index mark 13 which will shine red up to the time when after two or three idle transportation steps of the film strip the red color of index mark 13 will disappear because the left end 18 of the flat slide will cease to underlie this index mark. By this change of color of index window 13 the user knows that the camera now is ready for the beginning of the exposures. FIG. 1 shows the position of slide 16 after three exposures of the film, so mark 13 and the first three counter windows 6 have become dark. On further exposures an increasing number of windows 6 will become dark, and also the index marks 12, 9, 10 and 11, all of which at first are bright because of the underlying bright surface of slide 16 but which will become dark as the slide moves out from under them, thus allowing the operator to learn by one look at the index marks the number of exposures which have been made and which still will be available. At the end of the usable length of the film strip the blue index mark 14 will become dark, and on total disappearance of the blue color the camera casing can be opened.

The invention is not restricted to the described particulars of the counting and indicating means. For instance the flat slide may be of dark color at its upper surface directed towards the counter windows and may be displaceable on an underlying bright surface. In this case the counter windows and the index windows will appear dark at the beginning of exposures and will become bright with the progressing numbers of exposures, the bright windows then indicating the number of exposures which have been made. Also, if desired, at the beginning of film exposures the base surface indicating area may be exposed (with windows 6 appearing dark) and then the slide is moved from left to right step by step to progressively cover that area and become visible through each successive window as the film is exposed.

I claim:

1. In a roll-film still camera having a side wall provided with an oblong opening, means for indicating simultaneously the exposed and unexposed lengths of the film in the camera comprising a rectilinear bar of transparent material mounted in said wall opening, said bar having an exposed smooth outer surface and a concealed flat unpolished mat inner surface, the bar being provided along its inner surface with a plurality of closely spaced recesses arranged in a row extending lengthwise of the bar and forming exposure counter windows in the bar, the number of exposure counter windows in said row corresponding to the number of film frames, the inner end wall of each recess having an optical lens-forming curvature, and a longitudinally movable slide in the camera adjacent said inner surface of the bar for covering and uncovering said row of recesses and having an end movable along the row as the film is transported, said slide having a distinctive color visible through the windows that are covered by the slide.

2. In a roll-film camera as recited in claim 1, in which said outer surface of the transparent bar is transversely convex.

3. In a roll-film still camera having a side wall provided with an oblong opening, means for indicating simultaneously the exposed and unexposed lengths of the film in the camera comprising a rectilinear bar of transparent material mounted in said wall opening, said bar having an exposed smooth outer surface that is transversely convex and a concealed flat unpolished mat inner surface, said bar being provided along its inner surface with a plurality of closely spaced identical recesses arranged in a row extending lengthwise of the bar near one edge and forming exposure counter windows in the bar, the number of exposure counter windows in said row corresponding to the number of film frames, the inner end wall of each recess having an optical lens-forming curvature, said bar also being provided along its inner surface beside said row with a second row of recesses spaced apart a distance corresponding to a predetermined number of said counter windows, and a longitudinally movable slide in the camera for covering and uncovering said rows of recesses and having an end movable along the rows as the film is transported, said slide having a distinctive color that is visible through the recesses that are covered by the slide.

4. In a roll-film camera as recited in claim 3, the recesses in said second row being triangular with their apexes pointed toward said counter windows, and said second row recesses distinguishing from one another by being composed of different numbers of said triangles.

References Cited by the Examiner

UNITED STATES PATENTS

| 1,195,187 | 8/16 | Cuthbert. | |
| 2,804,041 | 8/57 | Neugass | 116—135 X |
| 3,053,140 | 9/62 | Brogan et al. | 116—114.10 X |
| 3,066,642 | 12/62 | Steinmetz et al. | 116—114.10 |
| 3,090,555 | 5/63 | Hell. | |
| 3,139,854 | 7/64 | Hedges et al. | 116—135 |

FOREIGN PATENTS 577,292   5/58   Italy.

EVON C. BLUNK, Primary Examiner.